United States Patent [19]
Lund

[11] Patent Number: 5,613,665
[45] Date of Patent: Mar. 25, 1997

[54] VEHICLE SUSPENSION COMPONENT

[76] Inventor: Ronn A. Lund, 4701 Manytell Ave., Anchorage, Ak. 99516

[21] Appl. No.: 556,210

[22] Filed: Nov. 9, 1995

[51] Int. Cl.⁶ ..................................................... F16F 1/00
[52] U.S. Cl. ................................................. 267/69; 267/72
[58] Field of Search .................................. 267/69, 70, 71, 267/72, 73, 74

[56] References Cited

U.S. PATENT DOCUMENTS

| | | |
|---|---|---|
| 3,653,677 | 4/1972 | Feser . |
| 4,389,066 | 6/1983 | Weir et al. . |
| 4,600,216 | 7/1986 | Burkholder . |
| 4,819,956 | 4/1989 | Campbell . |
| 5,054,800 | 10/1991 | Christensen et al. . |
| 5,242,176 | 9/1993 | Hendrickson . |
| 5,259,597 | 11/1993 | Fredheim ................................. 267/69 |

Primary Examiner—Matthew C. Graham
Attorney, Agent, or Firm—David P. Campbell

[57] ABSTRACT

A shock absorber (10) having an elongated first suspension component (12), a tubular second suspension component, (16) slidably coupled to the first suspension component, and an elastic cord loop (20) for restraining relative movement between the first and second suspension components. The second suspension component has an outer end (18) and the first suspension component has an inner end (19) and an outer end (14). An adjustment mechanism (36) is provided in the form of a rotatable threaded tube (38) mounted on first suspension component (12) and rotatably journaled to second suspension component (16). An adjustable lug (44) threads onto threaded tube (38). Elastic cord (20) wraps around lug (44) and inner end (19) of first suspension component (12). Rotation of tube (38) causes lug (44) to move axially along the length of first suspension component (12) to adjust the tension in elastic cord (20), to compensate for various loading conditions on the shock absorber.

18 Claims, 7 Drawing Sheets

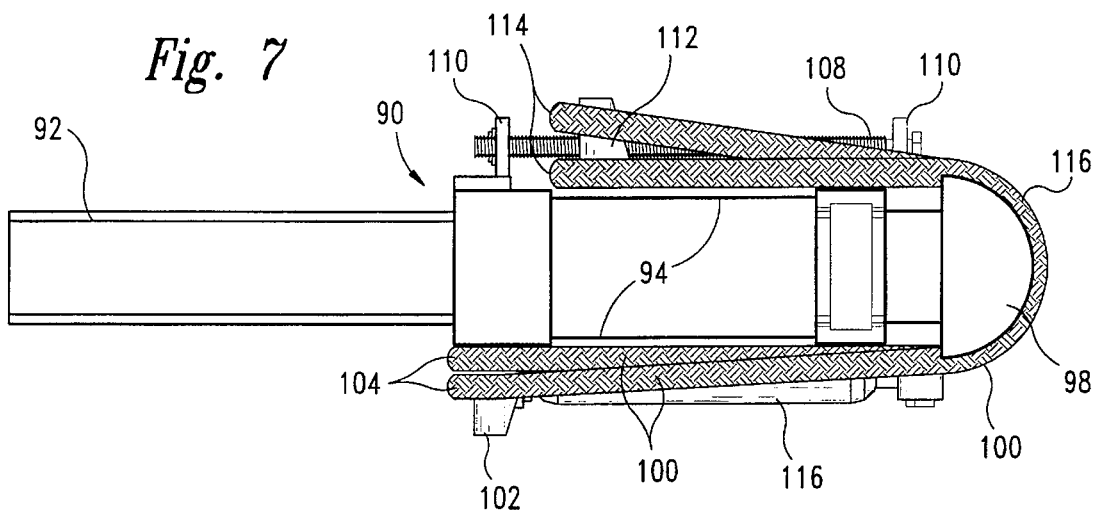
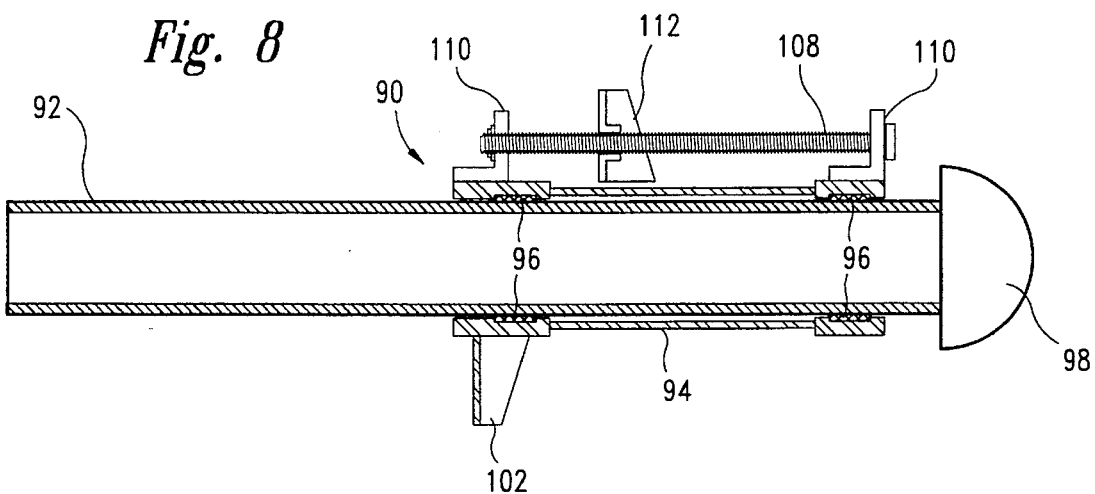
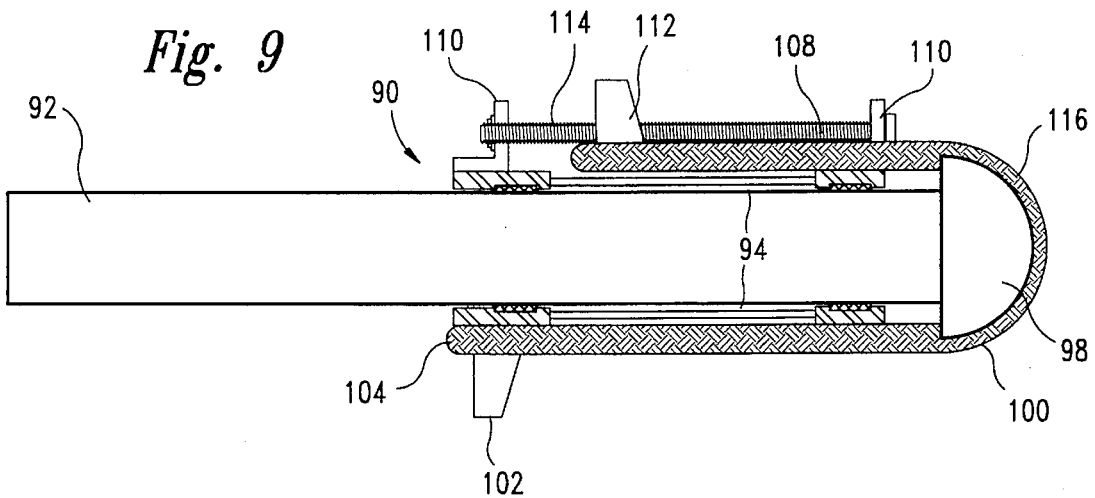

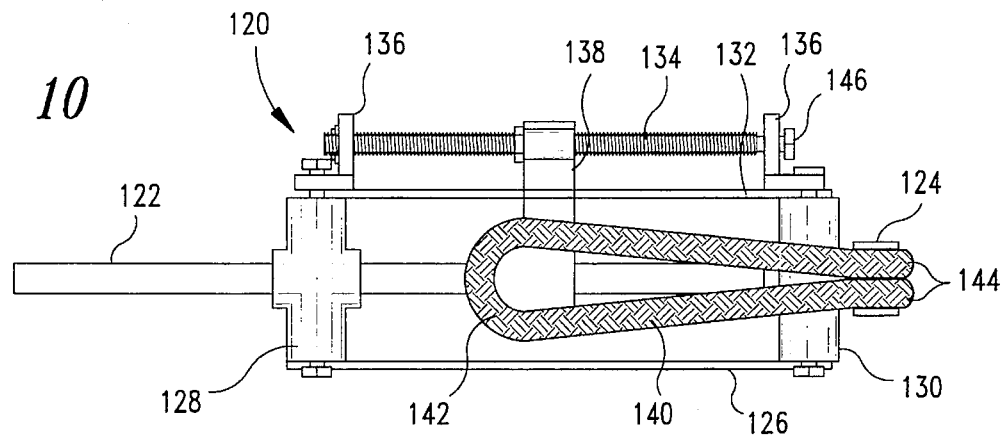
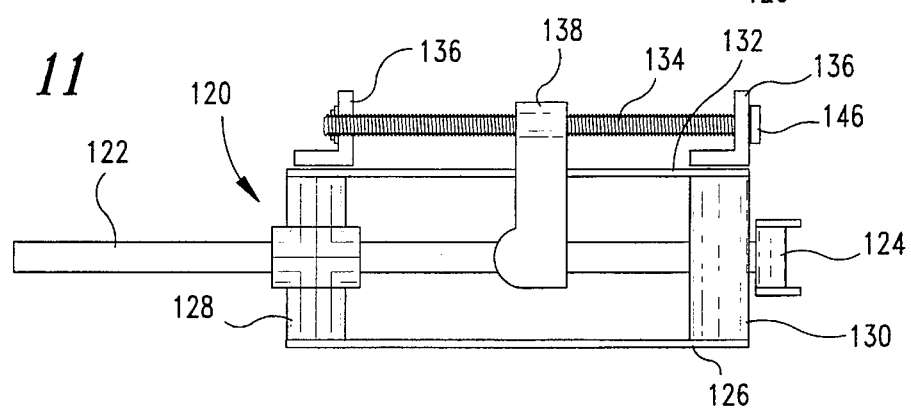
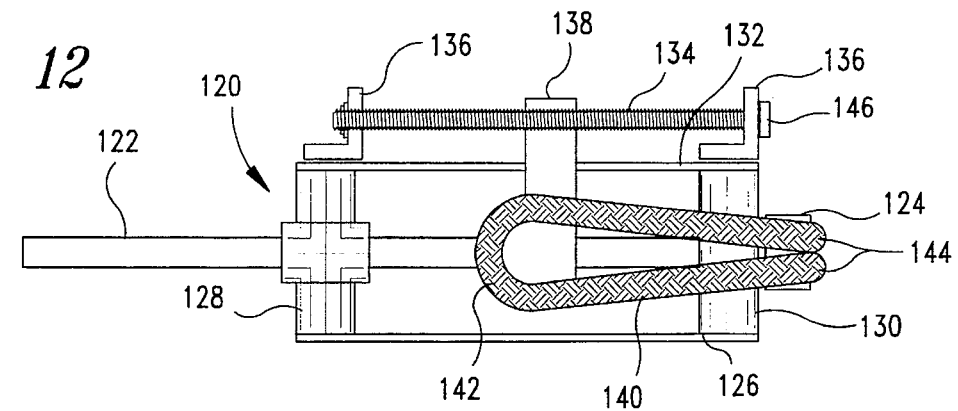
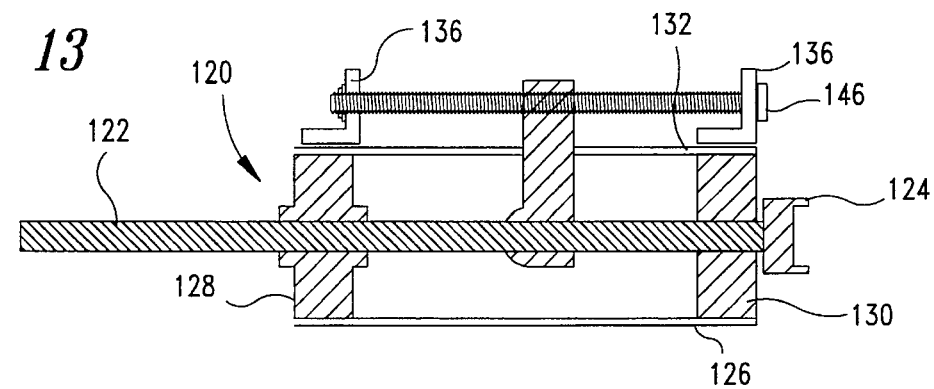

VEHICLE SUSPENSION COMPONENT

TECHNICAL FIELD

The present invention pertains to shock absorbers, and more particularly, to a shock absorber adapted to replace a strut-type shock absorber or coil spring over shock.

BACKGROUND OF THE INVENTION

U.S. Pat. No. 4,600,216 of Burkholder, entitled "Vehicle Steering and Suspension System," discloses a three-wheeled vehicle steering and suspension system that includes, inter alia, a pair of bungee cords that resist rotation of the cylindrical tubular housing of a support wheel assembly for each main wheel. The bungee cords are a part of the vehicle's suspension and steering system and work in combination with a pair of shock absorbers to allow for independent suspension of the main wheels.

U.S. Pat. No. 5,054,800 of Christiansen et al., entitled "Bicycle Trailer for Small Children," discloses a bicycle trailer including a frame that is slidably mounted onto a main axle rotatably journaled between the two main wheels of the trailer. A pair of bungee cords are draped over the trailer axle and around a couple of bosses at the lower extremity of the trailer frame. The bungee cords resiliently join the axle to the trailer frame.

The foregoing two patents should be considered in order to put the present invention into a proper perspective. It is an object of the present invention to utilize the advantages achievable with elastic cords, such as Bungee cords, in a suspension system that is self-contained and adapted for a variety of applications.

In one particular application, the present invention is designed to replace a strut-type shock absorber. For vehicles operating in cold weather conditions, oil-filled gas-charged shocks tend to heat up due to internal friction. This frequently occurs when the vehicle moves over rough terrain and at high speeds. The increased heat causes condensation to form on the inside of the cylinder and contaminates the oil with water. The result is a loss of performance from the shock absorber. This is a particular problem for snowmobiles where routine replacement and/or rebuild is required.

Additionally, dirt bikes have gone to much larger cylinder capacity for their shock absorbers. The result is an increase in weight, which is not desirable. The present invention also is designed to address this problem.

DISCLOSURE OF THE INVENTION

Briefly described, the present invention comprises a shock absorber having an elongated first suspension component having an outer end for attachment to a first part of a vehicle, a second suspension component slidably coupled to the first suspension component, to allow for relative sliding movement between the two components along the axis of the elongated first suspension component, and an elastic cord loop for restraining relative movement between the first and second suspension components.

The second suspension component has an outer end for attachment to a second part of the vehicle that is adapted to move relative to the first part of the vehicle. The first suspension component has an inner end around which the elastic cord loop is extended.

The second suspension component has a lug that is spaced axially from the inner end of the first suspension component. The opposite end loops of the elastic cord loop are wrapped around the lug. The elastic cord loop restrains movement of the inner end of the first suspension component away from the lug, thereby resisting compression of the first and second suspension components.

According to an aspect of the invention, the second suspension component includes an adjustment mechanism for adjusting the position of the lug relative to the inner end of the first suspension component, to increase or decrease the tension in the elastic cord. Preferably, the adjustment mechanism comprises a threaded tube for slidably receiving the first suspension component, the threaded tube being rotatably journaled to the second suspension component. The lug is threaded onto the threaded tube. A bar located between the lug and the boss end is attached to the second suspension component. The bar provides lateral stability for the lower end of the threaded tube and prevents rotation of the lug as the threaded tube is rotated. This allows the lug to move along the length of the threaded tube, to adjust its position relative to the inner end of the first suspension component. The adjustment mechanism includes a handle for rotating the threaded tube.

According to another aspect of the invention, the second suspension component includes a casing for enclosing the elastic cord. The handle extends to the exterior of the casing, to allow for manual adjustment of the lug. The casing protects the elastic cord loop and the lug from the elements.

According to another aspect of the invention, the second suspension mechanism includes a bar to restrain rotation of the lug as the threaded tube is rotated, thereby allowing the lug to move along the length of the threaded tube, to adjust its position relative to the inner end of the first suspension component.

In an alternative embodiment, the second suspension component has an exterior threaded tube with end walls for slidably receiving the first suspension component. The lug is slidably mounted on the first suspension component within the threaded tube and between the end walls. The threaded tube of the second suspension component has a slot extending along a portion of its length and the lug has a laterally projecting prong extending through the slot. The second suspension component has a collar threaded onto the threaded tube between the laterally projecting prong and the first end of the first suspension component. The collar is rotated to adjust the position of the lug relative to the first end of the first suspension component.

According to an aspect of this alternative embodiment, the threaded tube includes a pair of slots on opposite sides of the tube, and the lug includes a pair of prongs adapted to project through the slots and engage the collar. In this manner, the tension in the elastic cord biased the prongs of the lug against the collar, thus fixing the position of the lug.

These and other features, advantages, and objects of the present invention will become apparent from the following detailed description of the best mode, when read in conjunction with the accompanying drawings, and the claims, which are all incorporated herein as part of the disclosure of the invention.

BRIEF DESCRIPTION OF THE DRAWINGS

Like reference numerals refer to like parts throughout the several views, wherein:

FIG. 7 is a side view of a third embodiment of the shock absorber of the present invention;

FIG. 8 is a cutaway view of the shock absorber of FIG. 7 with the elastic cord loop removed;

FIG. 9 is a cutaway view of the shock absorber of FIG. 7 with only one elastic cord loop shown;

FIG. 10 is a side view of a fourth embodiment of the shock absorber of the present invention;

FIG. 11 is a cutaway view of the shock absorber of FIG. 10;

FIG. 12 is a cutaway view like FIG. 11 shown with an elastic cord loop;

FIG. 13 is a cutaway view like FIGS. 11 and 12, with the elastic cord loop removed;

BEST MODE FOR CARRYING OUT THE INVENTION

Figure 1:
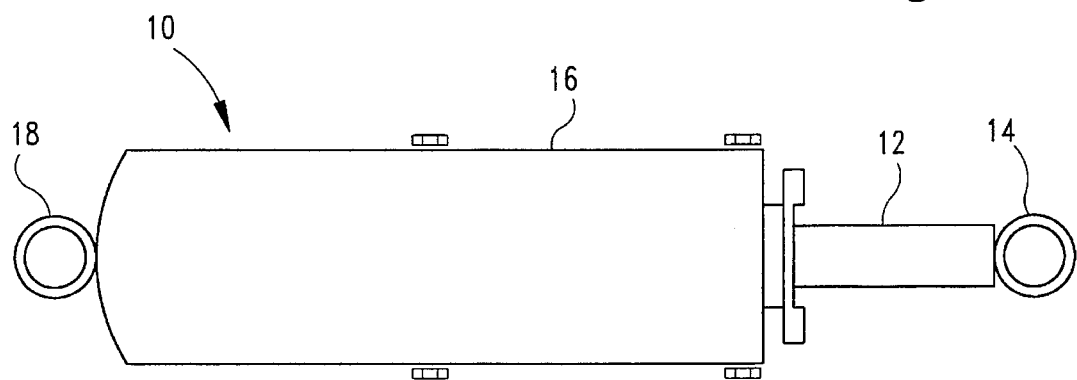
FIG. 1 is a side view of a first embodiment of the shock absorber of the present invention.
Figure 2:
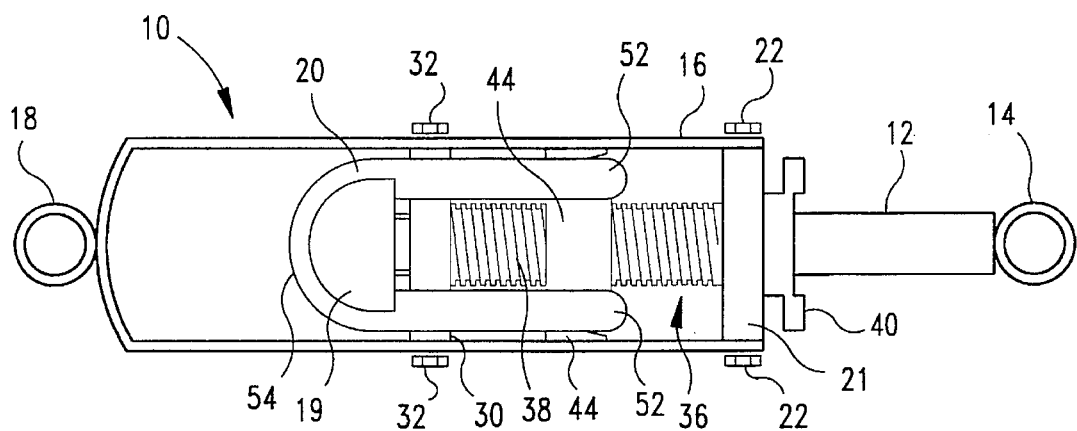
FIG. 2 is a cutaway view of the shock absorber of FIG. 1.
Figure 3:
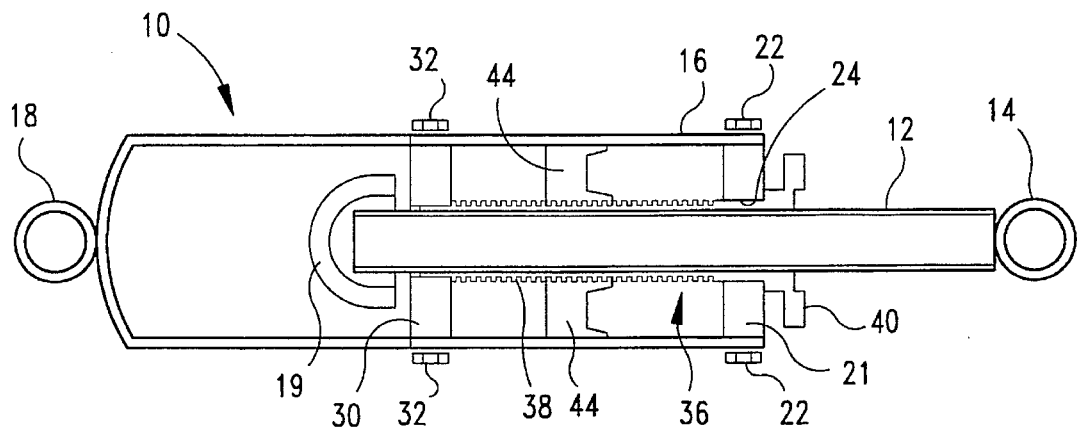
FIG. 3 is a cutaway view like FIG. 2 with the elastic cord loop removed.

A first embodiment for the present invention is shown in FIGS. 1–3. A shock absorber 10 is shown to include an elongated first suspension component in the form of a rod 12. Rod 12 includes an outer end 14 in the form of an eye. Eye 14 attaches to a first part of a vehicle in a manner well known in the art. Shock absorber 10 includes a second suspension component in the form of a tubular casing 16. Casing 16 has an outer end in the form of an eye 18 for attachment to a second part of a vehicle in a manner well known in the art. Relative movement between the first and second parts of the vehicle are cushioned by the shock absorber 10 of the present invention. Shock absorber 10 is designed to replace a conventional coil spring/strut-type shock absorber or may be mounted in other applications, such as in a seat chair, discussed later.

As shown in FIGS. 2 and 3, rod 12 has an inner end 19 in the form of a rounded boss for receiving an elastic cord loop 20. Tubular casing 16 includes an end wall 21 secured to casing 16 by bolts 22. Alternatively, a threaded end cap could be provided in lieu of end wall 21. End wall 21 includes an opening 24 for receiving rod 12. A stabilizer bar 30 is secured to casing 16 by-bolts 32. Stabilizer bar 30 includes a central opening to receive and support rod 12.

Shock absorber 10 includes an adjustment mechanism 36 in the form of a threaded tube 38 rotatably journaled in end wall 21 and stabilizer bar 30. Threaded tube 38 includes a handle or knob 40 extending beyond end wall 21, to allow for manual rotation of threaded tube 38. Threaded tube 38 and handle 40 slidably receive rod 12 within casing 16 to allow for relative sliding movement between the first and second suspension components.

Adjustment mechanism 36 includes an annular lug 44 that is threadably attached onto tube 38. Lug 44 is an annular member with a constant diameter around tube 38. However, lug 40 could comprise a sleeve with a pair of lateral projections on opposite sides of rod 12. Either way, lug 38 includes lateral projections for receiving the loop ends of elastic cord 20. Lug 44 is spaced axially from the inner end 19 of rod 12.

Elastic cord 20 can be any type of resilient, flexible cord, such as a bungee cord. Elastic cord 20 is a continuous loop and includes a pair of loop ends 52, which wrap around the lateral projections of lug 44. Ends 52 define a mid section 54, which extends around the inner, boss end of rod 12. Elastic cord 20 restrains movement between the first and second suspension components and does so by applying forces on the first and second suspension components in an-axial direction along their lengths so as to minimize placing any torques on the two suspension components. In this manner, wear and tear on the suspension components is minimized.

By rotating handle 40, and thereby rotating tube 38, lug 44 is moved along the length of tube 38 and does not rotate due to stabilizer bar 30. As lug 44 is adjusted along the length of tube 38, elastic cord 20 changes length and thereby changes the tension forces that it applies on the suspension components. By increasing or decreasing the tension in elastic cord 20, the shock absorber 10 can be pre-loaded to accommodate different loads and provide stiffer or softer suspension characteristics.

The arrangement of elastic cord 20 is such that the cord does not rub against itself, and friction with boss end 19 and lug 44 is minimized. Also, elastic cord 20 is protected from the elements by casing 16.

Alternatively, elastic cord 20 could be replaced with a pair of bungee cords, each having one of its ends attached directly to boss end 19 of rod 12 and its other end attached to lug 44. Both bungee cords would be shorter in length because they are not double looped. Boss end 19 would be rotated ninety degrees. With this alternative arrangement, the pair of bungee cords would provide tension in an axial direction, and would still function to bias the two suspension components into an extended position, and adjustment mechanism 38 would still operate to adjust the tension in elastic cord 20.

Figure 4:
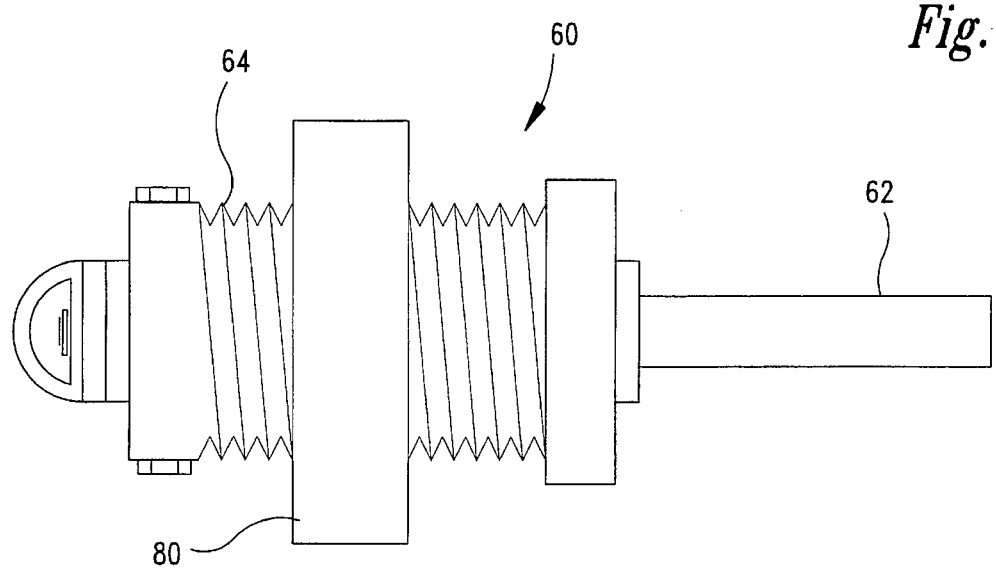
FIG. 4 is a side view of a second embodiment of a shock absorber of the present invention.
Figure 5:
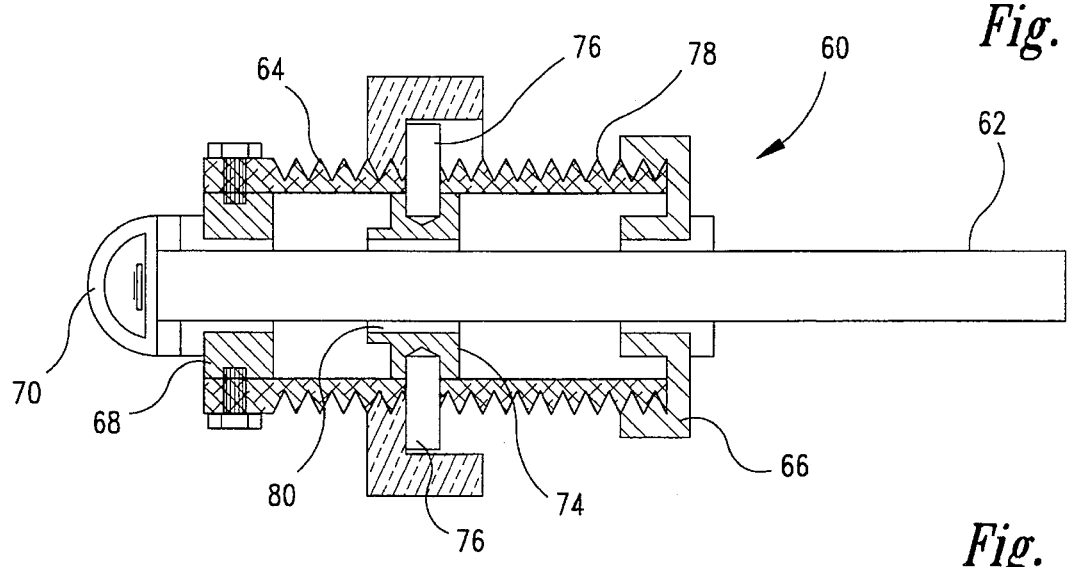
FIG. 5 is a cutaway view of the shock absorber of FIG. 4.
Figure 6:
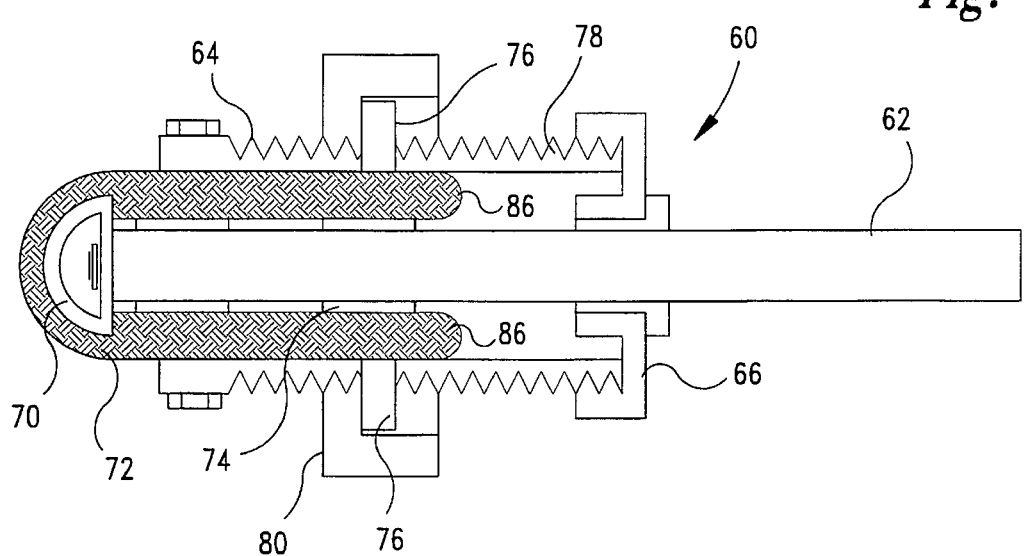
FIG. 6 is a cutaway view like FIG. 5 shown with the elastic cord loop.

An alternative embodiment for a shock absorber is illustrated in FIGS. 4–6. In this embodiment, a shock absorber 60 is shown to include an elongated first suspension component in the form of a rod 62 and a second suspension component in the form of a threaded tubular casing 64. Second suspension component 64 includes a pair of end walls 66, 68. End wall 68 is bolted to casing 64, and end wall 66 is threaded onto casing 64. Rod 62 is slidably coupled to second suspension component 64 through both end walls 66, 68. Rod 62 has a first end 70 in the form of a boss around which is extended an elastic cord 72. Elastic cord 72 is like cord 20 of FIGS. 1–3. An annular lug 74 slidably mounts within casing 64 around tube 62. Lug 74 includes a pair of prongs 76, which extend through longitudinal slots 78 in casing 64. Slots 78 extend along a portion of the length of casing 64 to accommodate axial movement of lug 74 and prongs 76. An annular collar 80 threadably mounts on the exterior of casing 64. Prongs 76 are adapted to extend through casing 64 and engage collar 80.

Elastic cord 72 includes a pair of ends 86, which wrap around annular lug 74. End wall 68 of second suspension component 64 includes a pair of openings for receiving the cord loops of elastic cord 72.

Adjustment of collar 80 along casing 64 moves lug 74 within casing 64 axially along the length of rod 62, and thereby increases or decreases the tension in elastic cord 72. Elastic cord 72 biases prongs 76 against collar 80 to fix in position lug 74 and to permit collar 80 to be rotated by application of a rotational force sufficient to overcome the frictional engagement in the threaded connection between collar 80 and tubular casing 64.

Preferably with this embodiment, elongated rod 62 attaches to the wheel or runner of a vehicle or trailer, and tubular casing 64 attaches to the frame of the vehicle or trailer. Elongated shaft 62 provides a range of travel for casing 64 limited only by the length of rod 62 and the degree of elasticity of cord loop 72. FIGS. 7–9 illustrate a third embodiment for a shock absorber 90. Shock absorber 90 includes a first suspension component in the form of a tubular rod 92 and a second suspension component in the form of a tubular sleeve 94. Tubular sleeve 94 slidably mounts onto rod 92 and includes a series of low friction bearings 96. Rod 92 includes a first end 98 in the form of a boss for receiving a pair of elastic cords 100. The embodiment of FIG. 9 has only one elastic cord 100. Tubular sleeve 94 has a first lug 102 mounted to one side of its end opposite boss 98. A first loop end 104 of each elastic cord 100 is wrapped around lug 102. Opposite lug 102 is mounted an external threaded rod 108. A pair of spaced brackets 110 carry threaded rod 108 and are themselves securely mounted to the second suspension component 94. A second adjustable lug 112 is rotatably threaded onto external threaded rod 108. Second lug 112 rotates independently of tubular sleeve 94 and independently of first lug 102.

Elastic cords 100 include second loop ends 114 that wraps around second lug 112. Loop ends 104, 114 of elastic cords 100 together define a midsection 116 that wraps around boss 98.

In this embodiment, elastic cords 100 are not protected by casing 94 from the elements, as with the prior embodiments, but can be more easily exchanged for different elastic cords that have more or less tension, to accommodate different loads.

Adjustment of second lug 112 along external threaded rod 108 moves second lug 112 axially along shock absorber 90 and increases or decreases the tension in elastic cords 100. The arrangement of elastic cords 100 around boss 98 and secured by first and second lugs 102, 112, provides resistance to relative movement between the first and second suspension components, which resistance is confined axially in the direction of relative movement between the components.

The shock absorber illustrated in FIG. 7 may also include an oil-filled piston/cylinder strut-type shock absorber 116. Strut 116 is secured at one end to second suspension component 94 and at its other end to rod 92 adjacent boss 98. Strut 116 is not illustrated in FIGS. 8 or 9.

FIGS. 10–13 illustrate a fourth embodiment, which combines features from both the embodiments of FIGS. 4–6 and FIGS. 7–9. In this alternative embodiment, shock absorber 120 includes a first suspension component in the form of an elongated rod 122 having a first end in the form of a boss 124, and a second suspension component in the form of a tubular casing 126. Tubular casing 126 includes a pair of end walls 128, 130. End walls 128, 130 slidably mount casing 126 onto elongated rod 122. Tubular casing 126 includes an elongated slot 132 extending along a portion of the length of tubular casing 126. An external threaded rod 134 is rotatably held by a pair of spaced brackets 136. Brackets 136 are secured to tubular casing 126.

An adjustment mechanism 138 in the form of an adjustable lug threadably mounts to external threaded rod 134 and extends through slot 132 into the interior of tubular casing 126. Within casing 126, lug 138 slidably couples to elongated rod 122. An elastic cord 140 includes a pair of loop ends 142 (only one shown), which wrap around opposite sides of lug 138. Loop ends 142 define a midsection 144 of elastic cord 140. Midsection 144 wraps around boss 124.

To adjust lug 138, threaded rod 134 is rotated, preferably by means of a tool applied to the threaded rod head 146 of rod 134. Rotation of external threaded rod 134 causes lug 138 to move within slot 132 along rod 122 toward and away from boss 124. In this manner, the tension in elastic cord 140 is decreased or increased.

Figure 14:
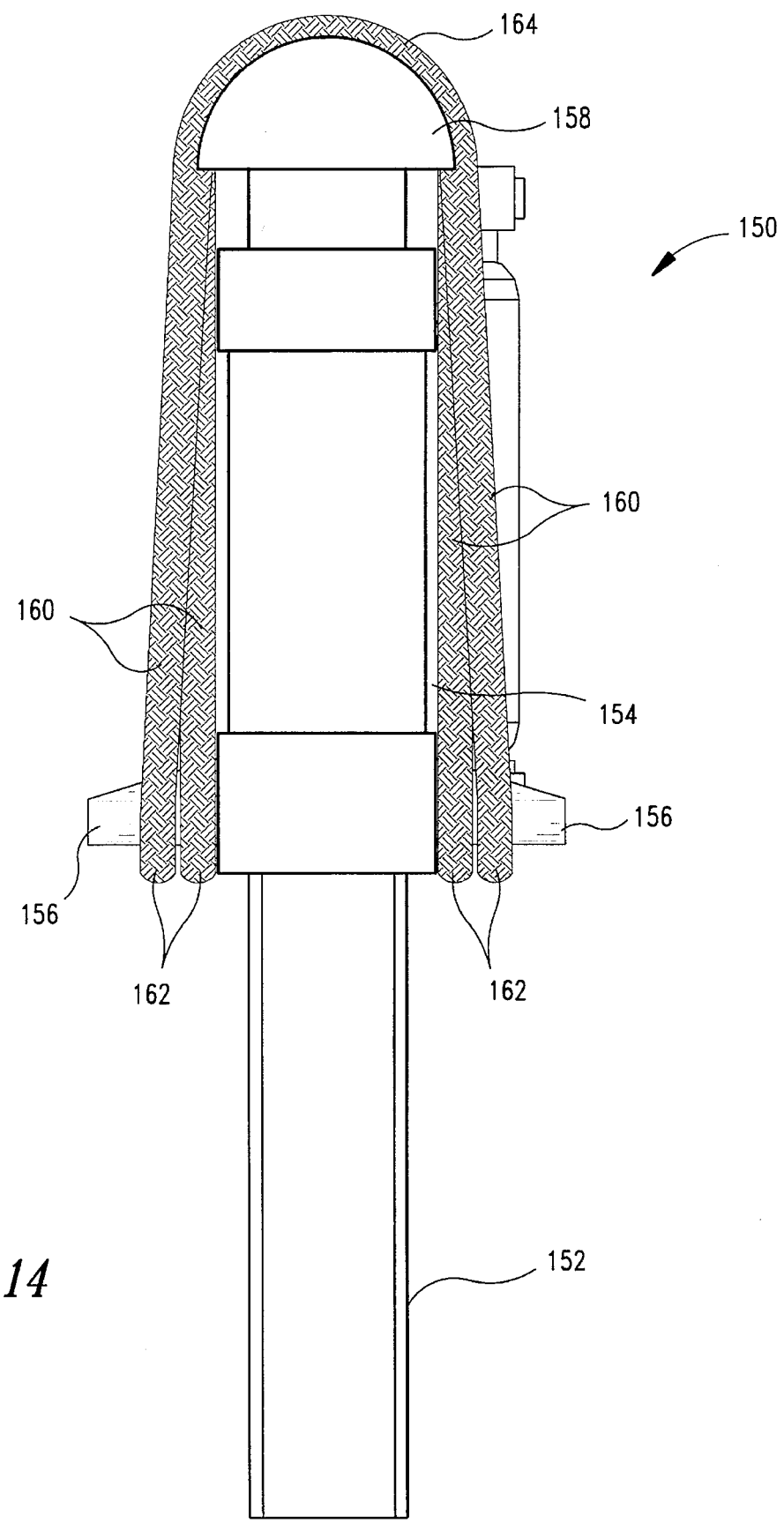
FIG. 14 is a side view of a fifth embodiment of the shock absorber of the present invention.

FIG. 14 shows another alternative embodiment similar to that of FIGS. 10–13. Shock absorber 150, in this embodiment, does not include an adjustment mechanism. A first suspension component 152 and a second suspension component 154 are slidably coupled together. Second suspension component 154 includes a pair of lugs 156 fixedly secured thereto. First suspension component 152 includes a boss end 158. A pair of elastic cords 160 each have loop ends 162 that wrap around lugs 156, and define a midsection 164 that wraps around boss 158.

An adjustment mechanism can be provided with this embodiment by providing a pair of additional lugs, spaced axially from lugs 156, and secured to second suspension component 154. Adjustment is made manually be re-looping cords 160 around the additional lugs. Also, bungee cord sizes can be changed to adjust tension.

In this embodiment, an additional dampening mechanism in the form of an oil-filled piston/cylinder shock absorber 166 is provided. Shock absorber 166 is secured at one end to second suspension component 154, and at its other end to the boss end 158 of first suspension component 152. Shock absorber 166 works in conjunction with elastic cord 160 to control relative movement between the first and second suspension components.

Figure 15:
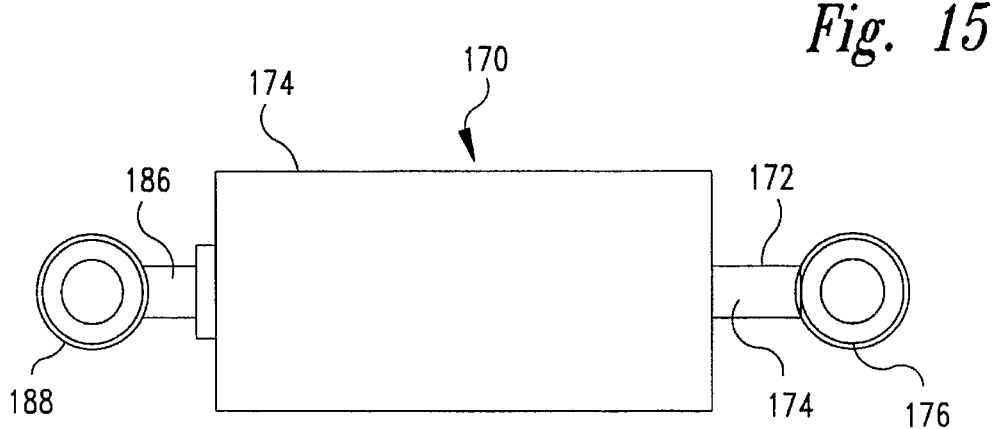
FIGS. 15, 16 and 17 illustrate a sixth embodiment of the shock absorber of the present invention.
Figure 16:
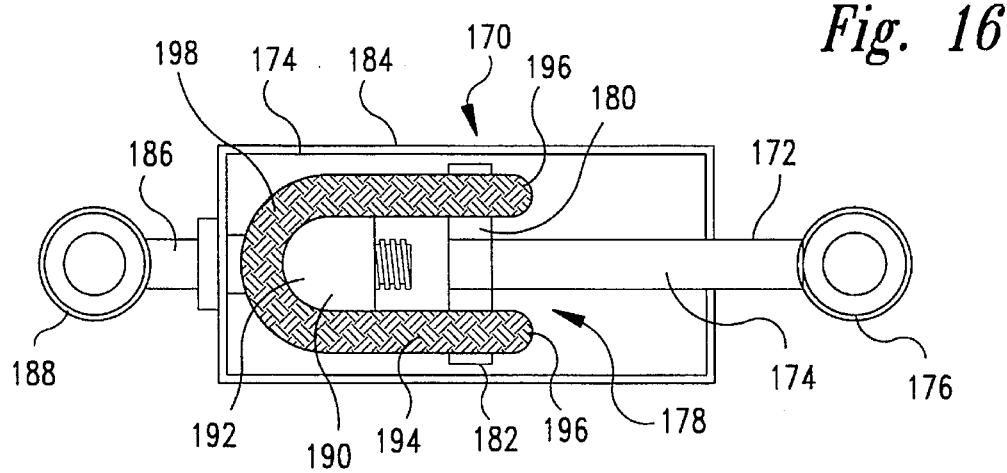
Figure 17:
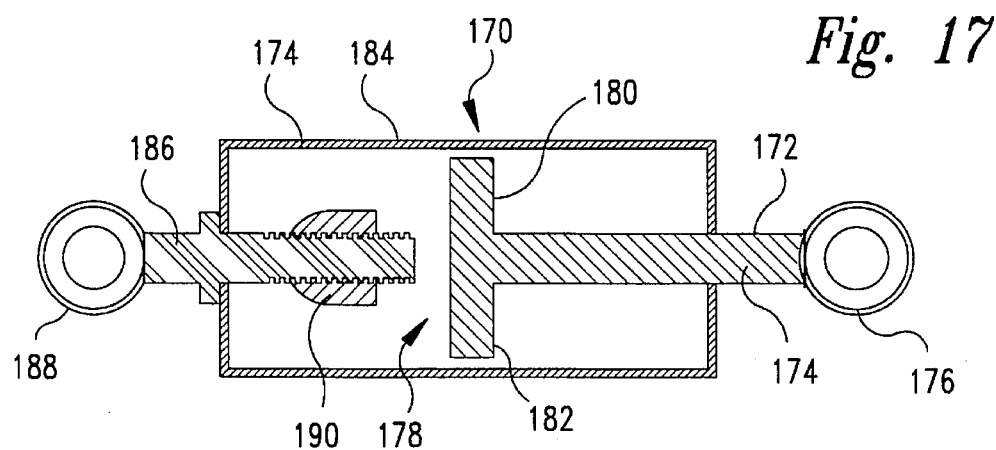

FIGS. 15–17 show another alternative embodiment of the shock absorber of the present invention. The shock absorber 170 includes a first suspension component 172 and a second suspension component 174. First suspension component 172 includes an elongated rod 174 with an eyelet 176 attached at one end. Elongated rod 174 includes a T-shaped inner end 178. Inner end 178 includes a pair of lateral prongs 180, 182.

Second suspension component 174 includes a tubular casing 184 and a shortened threaded rod 186. An eyelet 188 is secured to one end of rod 186. Rod 186 is rotatably mounted in casing 184. An internally-threaded adjustable lug 190 is threadably mounted onto threaded rod 186. Lug 190 includes a pair of bosses 192 (only one shown in FIG. 16) on either side of rod 186.

An elastic cord loop 194 includes a pair of loop ends 196 that define between them a midsection 198. Loop ends 196 wrap around prongs 180, 182, and midsection 198 wraps around bosses 192 of adjustable lug 190. Manual adjustment of lug 190, by rotation of bar 186, along threaded rod 186 changes the tension in elastic cord loop 194.

In this embodiment, elastic cord loop 194 restrains movement of first suspension component 172 and second suspension component 174 away from each other. Shock absorber 170 thus acts as a pull rod, rather than a push rod. Casing 184 encloses elastic cord loop 194, thereby protecting the cord from the elements. Casing 184 is shown in the figures in somewhat schematic form. The end of casing 184 adjacent eyelets 176 preferably should be provided with a removable end cap to provide access to elastic cord loop 194.

Figure 18:
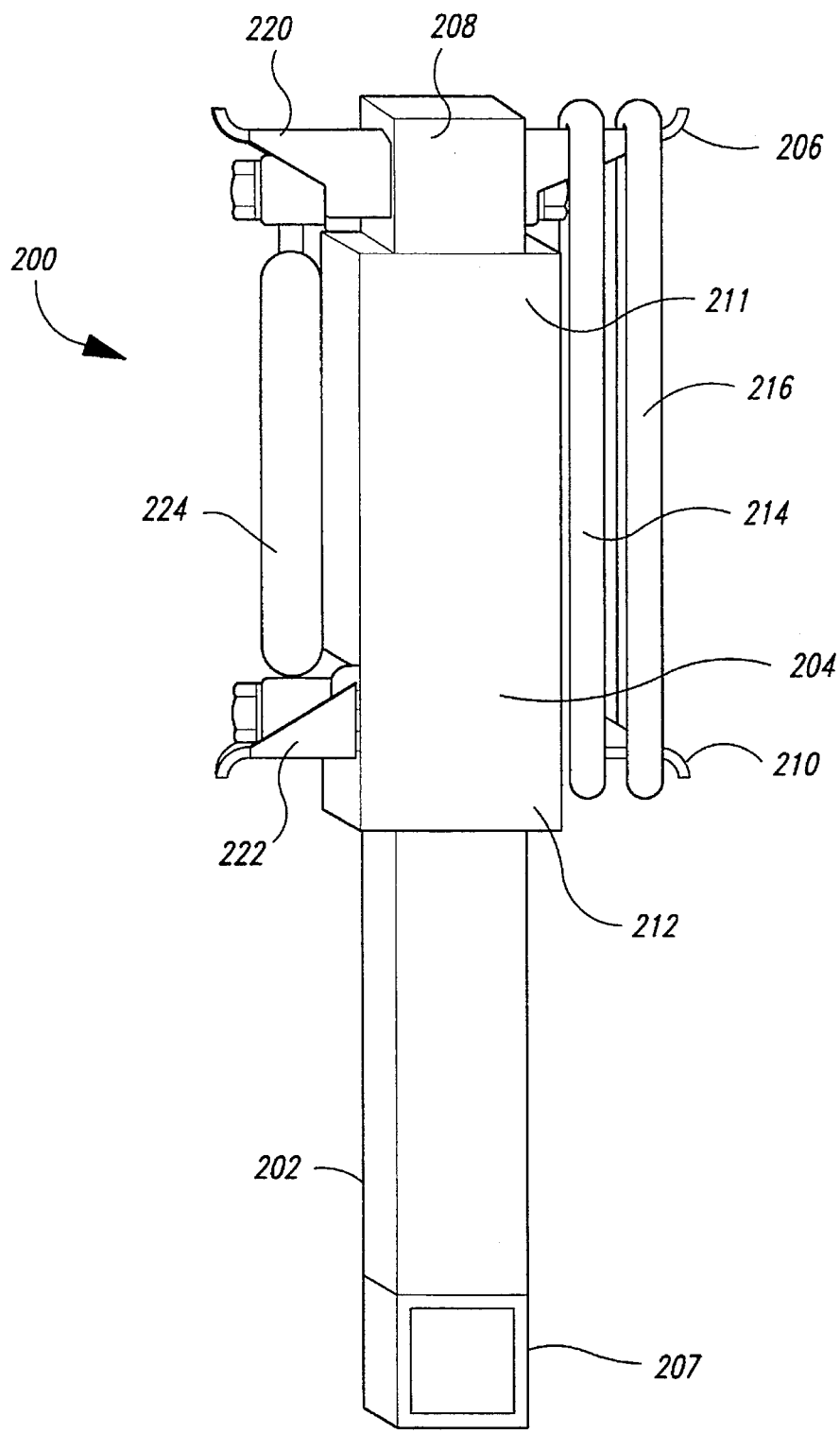
FIG. 18 illustrates a seventh embodiment of the shock absorber of the present invention.

FIG. 18 is another embodiment of a shock absorber 200 that is similar in many respects to the shock absorber of FIG.

14. Shock absorber 200 includes a first suspension component 202 in the form of a square bar, and a second suspension component 204 in the form of a tubular sleeve. Sleeve 204 slides on bar 202. First suspension component has an outer end 207 and an inner end 208. First suspension component 202 includes a lug 206 at its inner end 208. Second suspension component 204 has an upper end 211 and a lower end 212. Second suspension component 204 includes a similar lug 210 at its lower end 212. A pair of elastic cord loops 214, 216 are entrained around lugs 206, 210.

First suspension component 202 includes a bracket 220 at its inner end 208, and second suspension component 204 includes a bracket 222 at its lower end 212. A gas or oiled filled strut 224 is secured at its ends to brackets 220, 222. Strut 224 operates in conjunction with elastic cord loops 214, 216 to control compression of the suspension components, that is movement of outer end 207 toward lug 210.

The shock absorber illustrated in the several embodiments and discussed herein is designed to replace a conventional strut-type coil spring shock absorber used on many vehicles. Additionally, the shock absorber of the present invention, in any of its embodiments, could also be used in a variety of other applications. For example, the shock absorber could be mounted between a stem and a seat on a bicycle or a chair. The shock absorber could also be used on vehicles that have runners instead of wheels, such as sleds, trailers, or snowmobiles. In general, the shock absorber can be used to cushion relative movement between any two parts, and is not meant to be limited to any particular application discussed herein or otherwise.

Bungee cords weigh a fraction of the weight of steel or even alloy coil springs that provide the suspension for conventional shock absorbers. The casing of the present invention does not have to be of a heavy weight material because the bungee cord is carrying the load. In addition, the shock absorber of the present invention generates an insignificant amount of friction heat, and if any condensation should occur, it would have little affect on the performance of the shock absorber. Thus, the present invention should perform the same function as an oil-filled gas-charged shock and coil spring and achieve this function with less weight added to the vehicle. The present invention should also be more dependable and require less maintenance.

In the claims that follow, it should be understood that the second suspension component includes an outer end for attachment to one of the moving components of a vehicle or other apparatus. The outer end does not necessarily have to be the portion of the second suspension component farthest from the inner end of the first suspension component. Rather, the outer end can be any portion of the second suspension component capable of attachment to the vehicle.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A shock absorber, comprising:

an elongated first suspension component having an outer end for attachment to a first part of a vehicle, a second suspension component slidably coupled to the first suspension component to allow for relative sliding movement between the two components along an axis of the elongated first suspension component, the second suspension component having an outer end for attachment to a second part of the vehicle that is adapted to move relative to the first part of the vehicle, the first suspension component having an inner end, and the second suspension component including a lug at a location spaced axially between the inner and outer ends of the first suspension component, and an elastic cord loop for restraining relative movement between the first and second suspension components, the elastic cord loop having loop ends that define between them midsections, the loop ends of the elastic cord loop being wrapped around the lug and the midsections of the elastic cord loop being wrapped around the inner end of the first suspension component, whereby the elastic cord loop restrains movement of the inner end of the first suspension component away from the lug and thereby resists compression of the first and second suspension components.

2. The shock absorber of claim 1, wherein the second suspension component includes an adjustment mechanism for adjusting the position of the lug relative to the inner end of the first suspension component, to increase or decrease the tension in the elastic cord.

3. The shock absorber of claim 2, wherein the adjustment mechanism comprises a threaded tube for slidably receiving the first suspension component, the threaded tube being rotatably journaled to the second suspension component, the lug being threaded onto the threaded tube, and the second suspension component including a guide to restrain rotation of the lug as the threaded tube is rotated, thereby allowing the lug to move along the length of the threaded tube, to adjust its position relative to the inner end of the first suspension component.

4. The shock absorber of claim 3, wherein the adjustment mechanism includes a handle for rotating the threaded tube.

5. The shock absorber of claim 1, wherein the second suspension component includes a structural casing for enclosing the elastic cord.

6. The shock absorber of claim 5, wherein the adjustment mechanism includes a handle for rotating the threaded tube, the handle extending to the exterior of the casing, to allow for manual adjustment of the lug.

7. The shock absorber of claim 1, and further comprising an oil-filled piston/cylinder shock absorber attached at one of its ends to the first suspension component and attached at its other end to the second suspension component.

8. A shock absorber, comprising:

an elongated first suspension component, a second suspension component slidably coupled to the first suspension component to allow for relative sliding movement between the two components along an axis of the elongated first suspension component, an elastic cord loop for restraining relative movement between the first and second suspension components, the first suspension component having a first end for flexibly mounting one end of the elastic cord loop, the second suspension component including a lug at a location spaced axially from the first end of the first suspension component, the other end of the elastic cord loop being flexibly mounted on the lug, whereby the elastic cord loop restrains movement between the first and second suspension components, wherein the second suspension component includes an adjustment mechanism for adjusting the position of the lug relative to the first end of the first suspension component, to increase or decrease the tension in the elastic cord.

9. The shock absorber of claim 8, wherein the adjustment mechanism comprises a threaded tube for slidably receiving the first suspension component, the threaded tube being rotatably journaled to the second suspension component, the lug being threaded onto the threaded tube, and the second suspension component including a guide to restrain rotation of the lug as the threaded tube is rotated, thereby allowing the lug to move along the length of the threaded tube, to adjust its position relative to the inner end of the first suspension component.

10. The shock absorber of claim 9, wherein the adjustment mechanism includes a handle for rotating the threaded tube.

11. The shock absorber of claim 8, wherein the second suspension component includes a casing for enclosing the elastic cord.

12. The shock absorber of claim 11, wherein the adjustment mechanism includes a handle for rotating the threaded tube, the handle extending to the exterior of the casing, to allow for manual adjustment of the lug.

13. The shock absorber of claim 7, wherein the elastic cord loop has a pair of loop ends for restraining relative movement between the first and second suspension components, the first suspension component having a first end around which the elastic cord loop is extended, and wherein the loop ends of the elastic cord loop are flexibly extended around the lug, and wherein the second suspension component includes a threaded tube with end walls for slidably receiving the first suspension component, the lug being slidably mounted on the first suspension component within the threaded tube and between the end walls, the threaded tube of the second suspension component including a slot extending along a portion of its length and the lug including a laterally projecting prong extending through the slot, the second suspension component including a collar threaded onto the threaded tube between the laterally projecting prong and the first end of the first suspension component, to adjust the position of the lug relative to the first end of the first suspension component.

14. The shock absorber of claim 13 wherein the threaded tube includes a pair of slots on opposite sides of the tube, and the lug includes a pair of prongs adapted to project through the slots and engage the collar.

15. The shock absorber of claim 7, wherein the second suspension component includes a tubular casing, and wherein the first suspension component has a first end and the elastic cord loop has opposite ends defining a midsection, the midsection being extended around the first end, the second suspension component including first and second lugs at a location spaced axially from the first end of the first suspension component, the ends of the elastic cord loop being wrapped around the first and second lugs, the second suspension component including an external threaded rod mounted to the exterior of the tubular casing, at least one of the first and second lugs being threadably coupled to the threaded rod, so that one of the lugs is adjustable relative to the first end of the first suspension component, to adjust the tension in the elastic cord loop.

16. The shock absorber of claim 15, wherein both first and second lugs are threadably coupled to the threaded rod.

17. The shock absorber of claim 15, wherein one lug is fixed in position relative to the second suspension component and the other lug is threadably adjustable on the threaded rod.

18. The shock absorber of claim 17, wherein the second suspension component includes an elongated slot extending down a portion of its length, and the other lug that is threadably adjustable on the threaded rod extends through the slot in the tubular casing and is slidably coupled at one end on the first suspension component.

* * * * *